(12) United States Patent
Prehn

(10) Patent No.: US 10,309,134 B2
(45) Date of Patent: Jun. 4, 2019

(54) FASTENER FOR AN INDUSTRIAL TRUCK COMPRISING A TOGGLE CLAMP

(71) Applicant: Jungheinrich Aktiengesellschaft, Hamburg (DE)

(72) Inventor: Volkmar Prehn, Henstedt Ulzburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 609 days.

(21) Appl. No.: 15/009,305

(22) Filed: Jan. 28, 2016

(65) Prior Publication Data
US 2016/0215535 A1    Jul. 28, 2016

(30) Foreign Application Priority Data
Jan. 28, 2015    (DE) .......................... 10 2015 101 210

(51) Int. Cl.
*E05C 19/14*    (2006.01)
*E05B 79/10*    (2014.01)
(Continued)

(52) U.S. Cl.
CPC ........ *E05B 85/243* (2013.01); *B66F 9/07527* (2013.01); *E05B 79/10* (2013.01); *E05B 81/66* (2013.01); *E05C 19/14* (2013.01); *F16B 2/185* (2013.01); *Y10S 292/49* (2013.01); *Y10T 292/216* (2015.04)

(58) Field of Classification Search
CPC ............. Y10S 292/49; Y10T 292/0911; Y10T 292/0926; Y10T 292/0928; Y10T 292/0932; Y10T 292/0945; Y10T 292/0949; Y10T 292/1043; Y10T 292/1051; Y10T 292/1052; Y10T 292/1059; Y10T 292/1075; Y10T 292/108; Y10T 292/216; E05B 85/243; E05C 19/14

See application file for complete search history.

(56) References Cited

U.S. PATENT DOCUMENTS 1,573,866 A  *  2/1926  Rogers ................ E05B 65/0817
                                                     292/113
1,952,584 A  *  3/1934  Comstock .............. F23M 7/00
                                                     110/173 R
(Continued)

FOREIGN PATENT DOCUMENTS

DE    2311459 A1  *  9/1974  ............. E05C 19/14
DE    2609810 A1  *  9/1977  ........... B30B 9/3042
(Continued)

*Primary Examiner* — Carlos Lugo
(74) *Attorney, Agent, or Firm* — Barclay Damon LLP

(57) ABSTRACT

A closure for a toggle clamp for an industrial truck, wherein the closure has a holding part, a holding axle mounted to the holding part, a closure part, wherein the closure part has an anchoring element, a closing lever, a boundary axle mounted to the anchoring element, a closing lever pivotably mounted to the closing lever axle, a latch axle mounted to the closing lever, a latch mounted to the closing lever axle, the boundary axle, pivotably mounted to the latch axle, and the latch nose configured to engage the holding axle, a first spring element attached to the closing lever axle, and a second spring element attached to the latch axle, and a pivot axle configured to be attached to the industrial truck.

12 Claims, 4 Drawing Sheets

(51) Int. Cl.
*E05B 85/24* (2014.01)
*F16B 2/18* (2006.01)
*E05B 81/66* (2014.01)
*B66F 9/075* (2006.01)

(56) References Cited

U.S. PATENT DOCUMENTS

| | | | | |
|---|---|---|---|---|
| 2,087,143 A | * | 7/1937 | Geske | E05B 65/0042 |
| | | | | 292/2 |
| 2,703,727 A | * | 3/1955 | Vigmostad | E05B 83/16 |
| | | | | 292/121 |
| 2,750,064 A | * | 6/1956 | Clarke | A47J 41/0005 |
| | | | | 206/459.1 |
| 2,921,810 A | * | 1/1960 | Smith | E05C 19/145 |
| | | | | 292/113 |
| 3,297,348 A | * | 1/1967 | Griffiths | E05C 19/14 |
| | | | | 292/113 |
| 3,584,906 A | * | 6/1971 | Budzyn | E05C 19/14 |
| | | | | 292/247 |
| 3,706,467 A | * | 12/1972 | Martin | E05C 19/14 |
| | | | | 292/111 |
| 3,806,174 A | * | 4/1974 | Herman | E05C 19/14 |
| | | | | 292/113 |
| 4,318,557 A | * | 3/1982 | Bourne | B64D 29/06 |
| | | | | 292/113 |
| 5,257,839 A | * | 11/1993 | Nielsen | E05C 19/14 |
| | | | | 292/104 |
| 5,630,507 A | * | 5/1997 | Baker | A61F 17/00 |
| | | | | 206/1.5 |
| 5,732,987 A | * | 3/1998 | Wright | E05C 19/14 |
| | | | | 292/113 |
| 5,984,382 A | * | 11/1999 | Bourne | B64D 29/06 |
| | | | | 292/113 |
| 6,203,076 B1 | * | 3/2001 | Wytcherley | E05B 7/00 |
| | | | | 292/197 |
| 6,957,979 B2 | * | 10/2005 | Welsh | H05K 7/1409 |
| | | | | 439/545 |
| 7,017,955 B1 | * | 3/2006 | Chiang | E05C 19/14 |
| | | | | 292/113 |
| 7,397,674 B2 | * | 7/2008 | Schlack | H05K 7/1409 |
| | | | | 361/754 |
| 7,530,609 B2 | * | 5/2009 | Beauchamp | E05B 83/24 |
| | | | | 292/126 |
| 8,807,608 B2 | * | 8/2014 | Schuler | B60L 11/1822 |
| | | | | 180/68.5 |
| 8,870,245 B2 | * | 10/2014 | Johnson | E05B 63/0013 |
| | | | | 292/197 |
| 2012/0102840 A1 | * | 5/2012 | Chen | E05B 1/003 |
| | | | | 49/449 |

FOREIGN PATENT DOCUMENTS

| | | | | |
|---|---|---|---|---|
| DE | 102004047339 | | 3/2006 | |
| DE | 102006057490 | | 6/2008 | |
| DE | 102009034703 | | 1/2011 | |
| GB | 789992 A | * | 1/1958 | E05C 19/14 |

* cited by examiner

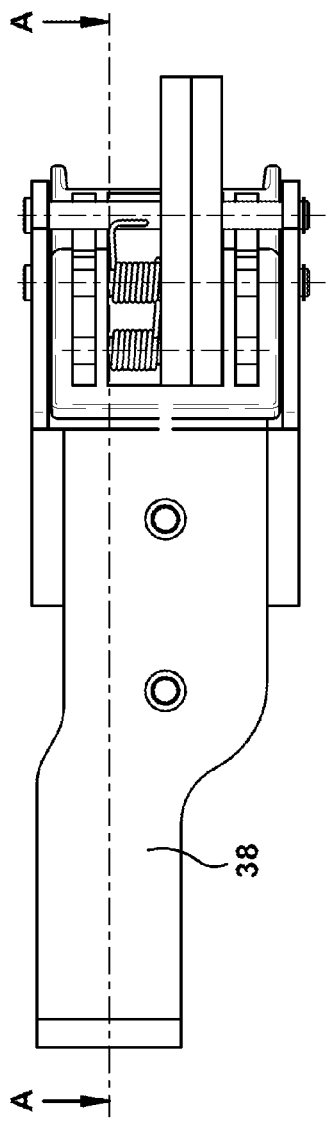
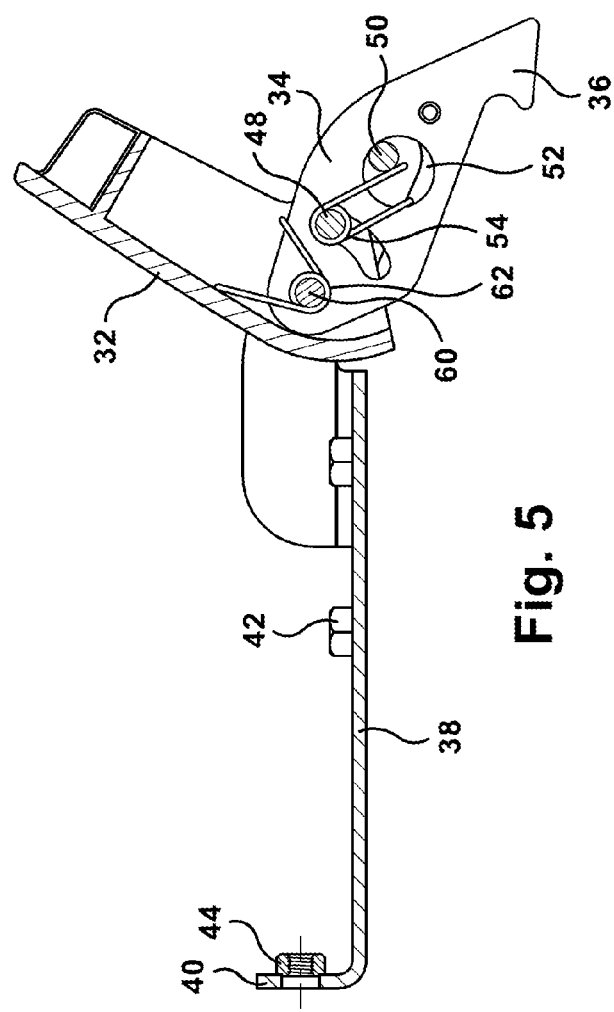
Fig. 4
Fig. 5

Position 2 (lifted)

Position 1 (open)

Position 4 (clamped)

Position 3 (caught)

FASTENER FOR AN INDUSTRIAL TRUCK COMPRISING A TOGGLE CLAMP

CROSS REFERENCE TO RELATED APPLICATION

This application is based upon and claims priority to German Patent Application No. 10 2015 101 210.3, filed Jan. 28, 2015, under relevant sections of 35 USC § 119, the entire contents of which are hereby incorporated by reference.

BACKGROUND OF THE INVENTION

The present invention relates to a closure with a toggle clamp for an industrial truck with a closure part and a holding part. The holding part has a holding axle, on which the closure part is locked.

Closures with toggle clamps are used e.g. in doors and hoods, which are locked shut by hooks, clamps and levers. The operation and handling of closures with toggle clamps has proven to be particularly cumbersome. In known toggle clamps, installation of the clamping element on the holding part is cumbersome, whereby operation is impeded. Moreover, conventional toggle clamps are difficult to integrate into the exterior design of a vehicle since their levers project and protrude from a contour progression.

The battery hood closure on an industrial truck is particularly important because it is not only used to close but also to simultaneously exert a force on the battery positioned in the battery compartment via the battery hood closure. An important requirement for a closure with a toggle clamp, in particular for a battery hood closure on an industrial truck, is to create a sufficiently large clamping force in order to lock all components in place in a rattle-free manner. A simple and comfortable operation should also be possible, which prevents faulty operation. Moreover, the battery hood in many vehicles is also a central component from the design point of view so that an optically well integrated closure is desired. The closure should also be inexpensive to produce and simple to install.

The object of the invention is to provide a closure with a toggle clamp for an industrial truck, which achieves the aforementioned goals with easy and comfortable operation.

BRIEF SUMMARY OF THE INVENTION

The closure according to the invention with a toggle clamp is provided for an industrial truck, which is equipped with a closure part and a holding part provided with a holding axle. The closure part has an anchoring element for connection with a vehicle part and a closing lever. The closing lever is pivotably mounted around a closing axle provided on the anchoring element and has a latch axle on its end pointing towards the anchoring element. A latch, which has a latch nose in the form of a projection on its other end, with which the holding axle can be caught behind and clamped, is pivotably mounted around the latch axle. Two spring elements are provided on the toggle clamp according to the invention, one spring element of which pushes the closing lever into the open position and the second spring element pushes the pivotably mounted latch into the closed position. The latch has two through holes, of which the closing lever axle extends through a first through hole and a boundary axle arranged on the anchoring element extends through the second through hole. Both through holes as well as the axles passing through them restrict and guide the movement flow of the latch so that the latch assumes a defined snap position with respect to the holding axle of the holding part under the influence of the spring forces. When closing, the latch first hits the holding axle and catches behind it, wherein the second spring element is deflected.

Then, when the closing lever is actuated, the latch axle and the pivot axle are moved through a dead center formed with the holding axle. The special advantage of the closure according to the invention is that an automatic snapping of the latch onto the holding axle can take place and, with the subsequent movement of the closing lever, the latch is moved through the dead center formed by the latch axle, pivot axle and holding axle, and the closing lever, despite the opposing spring force, is held by the generated clamping force in the closed position. A special advantage of the closure according to the invention is that the movement leading to a final locking is made up of two components. On one hand, the closure part with the latch in a defined position leads to the latch easily and reliably catching behind and snapping onto the holding axle. On the other hand, an adjustment of the closing lever with the snapped in latch can move it through the dead center in order to thus lock the toggle clamp.

In a preferred further development, in a closed position, the latch axle and pivot axle are moved through the dead center formed with the holding axle through the raising of the closing lever, whereby the clamping force is first removed. Through a further pivoting of the closing lever opposite the spring force, the latch is lifted out of the rear grip on the holding axle. A releasing and opening of the closure is thus possible with a continuous movement of the closing lever.

In a preferred design, the closure part is installed on a pivotable vehicle part and the holding part is fixed to the vehicle.

In a preferred design, both spring elements are designed identically. The installation of the toggle clamp is also hereby simplified since there is no difference between the two spring elements.

In a preferred design, the first through hole in the latch is designed as an elongated shape, which surrounds the closing lever axle. The first through hole is designed as a bent elongated hole, which restricts the pivot range of the latch around its latch axle and provides sufficient play to snap behind the holding axle.

In a preferred design, the second through hole is designed with an oval or round shape. The boundary axle passing through the second through hole moves along the circumference of the second through hole, wherein preferably, when the latch catches behind or releases from the holding axle, the boundary axle releases from the circumference of the second through hole. Even in the closed position, the boundary axle is free in the second through hole and is not in contact with its circumferential wall.

In a particularly preferred design, an industrial truck is equipped with the closure according to the invention, wherein the closure part is arranged on a pivotable cover part, which snaps behind the latch of the closure part on the holding axle when pivoted into its position to be closed. Through the pivoting of the cover part into a closed but not yet locked position, the latch catches behind the holding axle. In a preferred design, the latch is lifted out by the closing lever behind the holding axle after the latch axle and the pivot axle have been moved into a released position through the dead center out of the locked position. The closure part of the toggle clamp is preferably arranged on a battery hood cover and is pivotable on a bracket with the battery hood cover, which lets the latch snap into a position engaging behind the holding bushing in the closed position of the battery hood cover.

A further factor, facilitating installation in particular, is that the anchoring element for the closure part has a flat anchoring plate with a raised end section on the end facing away from the closing lever, wherein the anchoring plate has one or more bore holes for fastening means and the end section has at least one bore hole for a spacing means, via which the dead center of the toggle clamp is adjustable. In this design, the anchoring element is first fastened on the industrial truck such that the anchoring element can still be shifted. The position of the anchoring element before a final securing of the anchoring element is determined via the spacing means. The criterion here is to set the dead center such that the closing lever is easily and effectively set.

In a preferred design, a sensor is provided in the area of the holding part, which detects the snapping in and/or locking of the latch. The sensor can be installed on the holding part itself or in the area of the vehicle covering, which is located adjacent to the holding part. Depending on the design, one or two different positions of the latch can be detected. A first detectable position is the latch in the snapped in state on the holding axle. The second state measurable by the sensor is the locked latch. For example, a proximity sensor, which can differentiate whether the latch is only snapped in or also locked, e.g. by the movement of the tip of the latch, can be provided as the sensor.

BRIEF DESCRIPTION OF THE DRAWINGS

A preferred design of the invention is explained in greater detail below based on an exemplary embodiment. The figures show in:

FIG. 4 is a view of the closure part from below, FIG. 5 is a sectional view along the line A-A from FIG. 4.

DETAILED DESCRIPTION OF THE INVENTION

Figure 1:
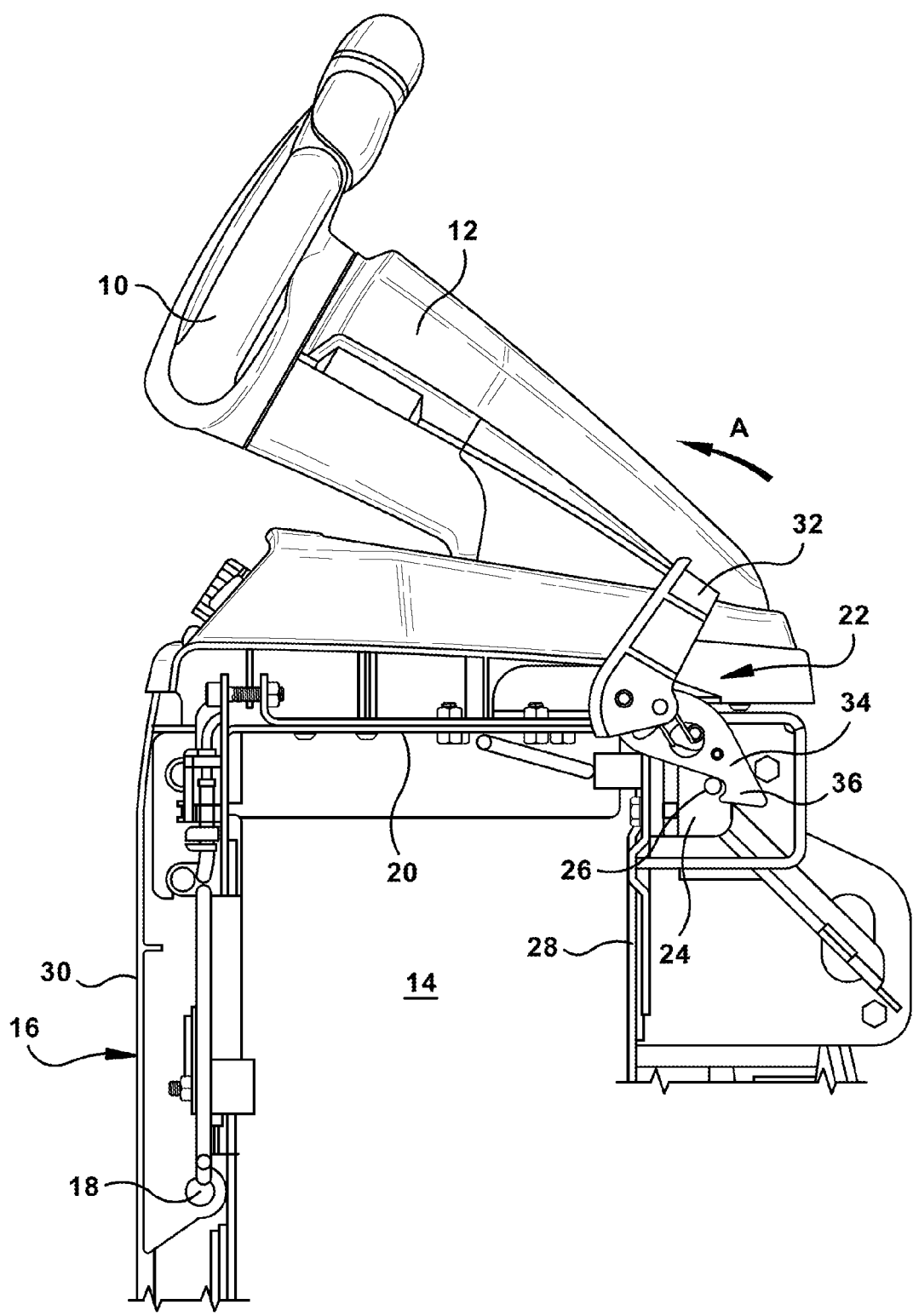
FIG. 1 depicts a cross-section through a battery hood closure.

FIG. 1 shows a drive part of an industrial truck in a sectional view from the side. The industrial truck is operated via a control unit 10, which is arranged on a support 12. A section of the battery compartment 14 can be seen below the support 12. The battery compartment 14 is closed via a battery hood cover 16, the pivot axle 18 of which is arranged fixed on the vehicle. The battery hood cover 16 is pivoted open and closed again via the pivot axle 18. The battery hood cover 16 has an L shape, wherein the upside-down L with the free end of its vertical line is hinged on the vehicle. The pivot axle 18 lies behind and below a closure part 22. The closure part 22 of the toggle clamp is arranged on the horizontal section 20 of the battery hood cover 16. The holding part 24 with the holding axle 26 is arranged on the vertical wall 28 of the drive part, which is fixed on the vehicle. The wall 28 runs parallel to the vertical section 30 of the pivotable battery hood cover 16.

FIG. 1 shows the closing lever 32 and the latch 34 on the closure part 22. The latch 34 has a nose-shaped projection 36, with which it catches behind the holding axle 26. In the position of the latch 34 shown in FIG. 1, the latch can be lifted and released from the holding axle 26 through a movement of the closing lever 32 in the direction of the drawn-in arrow A.

Figure 2:
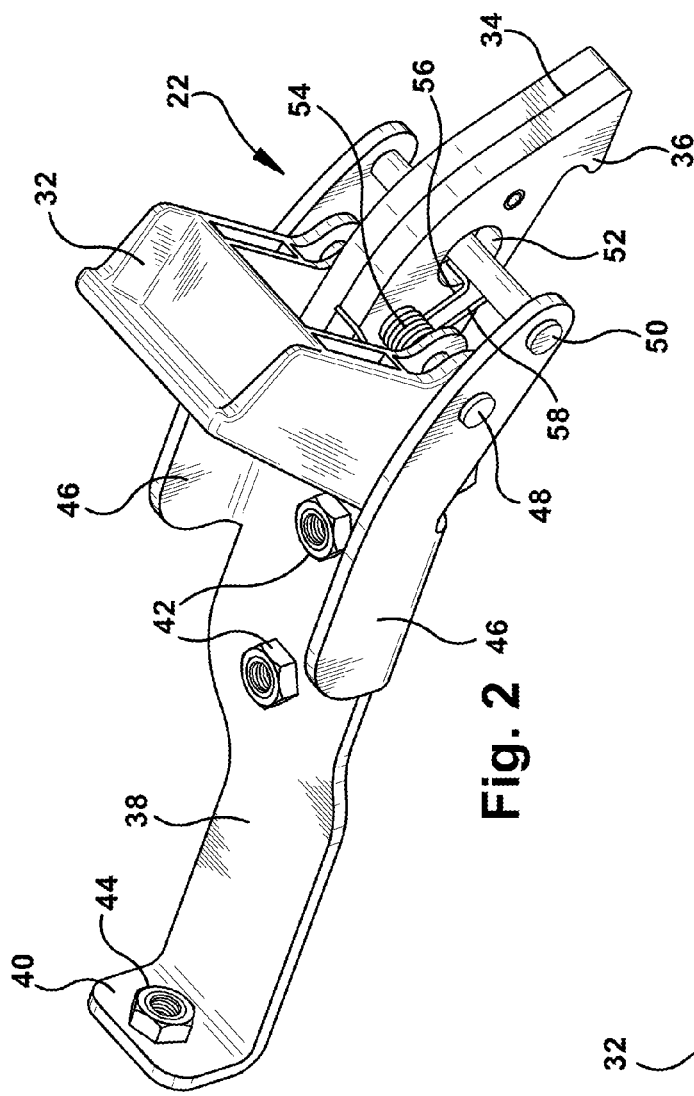
FIG. 2 is a perspective view of the closure part of the toggle clamp with an open closing lever.
Figure 3:
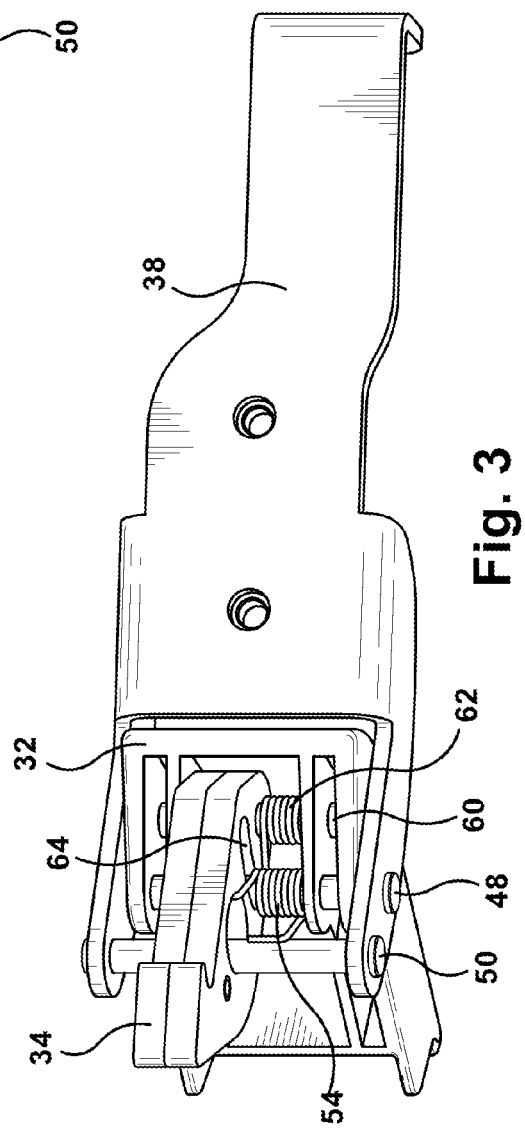
FIG. 3 is a perspective view of the closure part of the toggle clamp with a view of the latch.
Figure 6B:
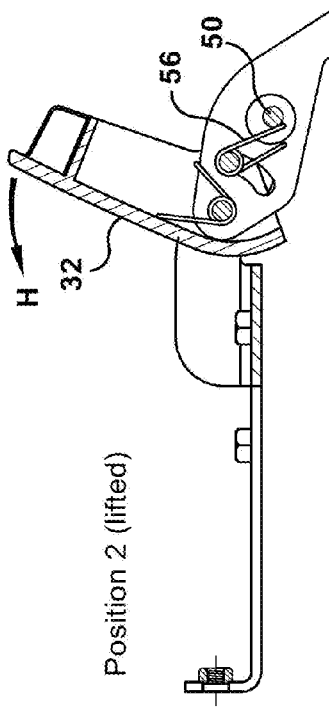
FIG. 6 is four different positions of the toggle clamp.
Figure 6A:
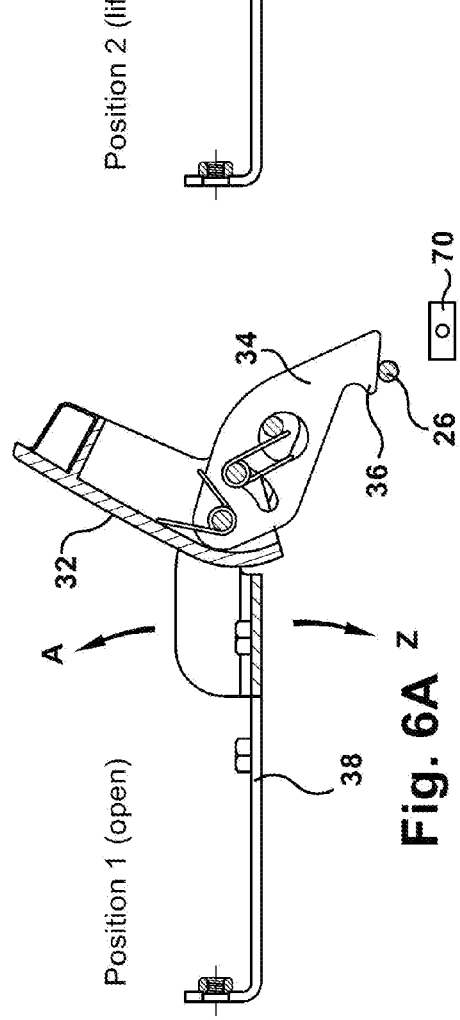
Figure 6D:
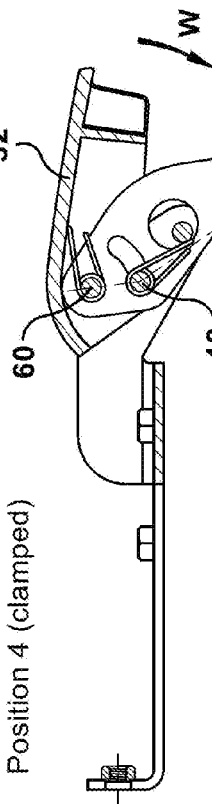
Figure 6C:
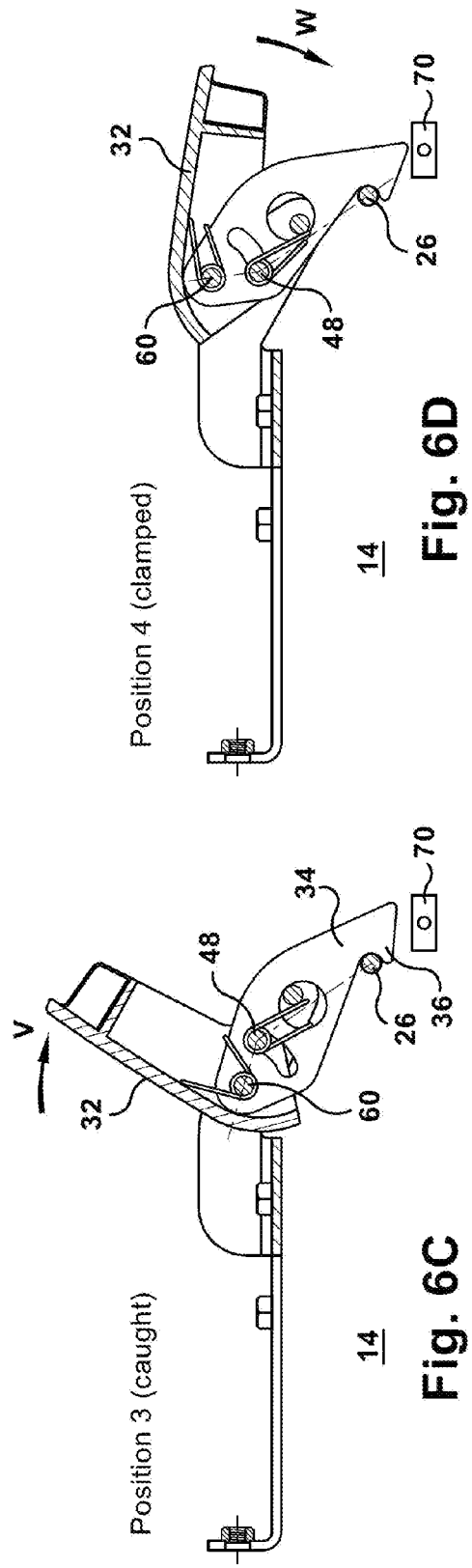

A more detailed structure of the closure part 22 arises from the perspective representations in FIGS. 2 and 3. FIG. 2 shows the closure part 22, which has an anchoring plate 38 with a raised end section 40. The anchoring plate 38 is provided with two locking nuts 42 and the raised section is provided with one locking nut 44. The anchoring plate transitions into two lateral arms 46, which carry a closing lever axle 48 and a boundary axle 50. The closing lever 32 is pivotably mounted on the closing lever axle 48. The closing lever 32 is made of a plastic material, for example fiber-reinforced polyamide, while the other parts are preferably made of metal. The latch 34 with its second through hole 52 can also be seen in FIG. 2. The second through hole 52 has a circular shape and the boundary axle 50 passes through the second through hole 52.

FIG. 2 shows a spring element 54, which abuts with one arm 56 against the second through hole 52 and with the other arm 58 against the boundary axle 50. The nose 36 engaging behind the holding axle 26 can also be seen in FIG. 2.

FIG. 3 shows the closure part 22 in a view of the anchoring plate 38 from below. A latch axle 60 can also be seen in the view from below. The latch axle 60 is arranged on the closing lever 32. The latch 34 can be pivoted around the latch axle 60, wherein the latch 34 is pretensioned with respect to the closing lever 32 by a spring element 62 arranged on the latch axle 60. The through hole 64, through which the closing lever axle 48 passes, can also be seen in the view from FIG. 3. The through hole 64 is designed as an arched elongated hole.

The structure of the closure part 22 of the toggle clamp can be seen from FIG. 4 and the sectional view from FIG. 5. FIG. 5 shows the closing lever 32 and the latch 34. The latch 34 is pivotably mounted on the closing lever 32 via the latch axle 60. With respect to the closing lever axle 48, the latch axle 60 is arranged on the side pointing towards the anchoring plate 38. In other words, the latch axle 60 is located on the part of the latch 34 pointing away from the latch nose 36. Latch 34 and closing lever 32 are locked against each other by the spring element 62. The spring element 54 is arranged on the closing lever axle 48 and locks the latch 34 with respect to the boundary axle 50. In the case of a pivoting of the closing lever 32 in the position shown in FIG. 5, the latch is pivoted in the direction of the closed position, wherein the boundary axle 50 moves in the through hole 52 along the circumference. When the latch 34 with the latch nose 36 hits the holding axle 26, the latch nose moves against the force of the spring 54 in the second through hole 52, and snaps behind the holding axle 26, as shown for example in FIG. 1.

With positions 1 to 4, FIG. 6 shows different positions for the toggle clamp. In position 1, the toggle clamp is open and the latch 34 is located above the holding axle 26. As can be seen by the tilt of the anchoring plate 38, the battery hood cover (not shown) in position 1 (open) is not yet completely closed. If the anchoring plate 38 is moved in the direction of arrow Z, then the latch nose 36 slides over the holding axle 26 and thereby ends up in position 3. If, in contrast, the closing lever 32 is moved from position 1 further in direction A, the battery hood cover opens and is swung open.

Position 3 shows the latch 34 in its caught position, in which the latch nose 36 catches behind the holding axle 26. In this caught position, the latch axle 60, the closing lever axle 48 and the holding axle 26 do not lie on one line, but rather form a triangle, in which the closing lever axle points away from the battery compartment 14. If the closing lever 32 in position 3 (caught) is pivoted in direction V, then the closing lever axle 48 moves through the dead center and the toggle clamp into its clamped position, which is shown in position 4 (clamped). In position 4 (clamped), the closing lever axle 48 together with the latch axle 60 and the holding axle 26 again form a triangle, in which however the closing lever axle 48 points towards the battery compartment.

The toggle clamp is clamped in position 4. It is clear in position 4 why the toggle clamp according to the invention is particularly well integrated into the contour of the battery hood. Through the further movement of the closing lever 32 in the direction of arrow w, it can be adjusted to the adjacent edge of the battery hood and is thus integrated into the contour.

Starting from position 3 (caught), in which the latch 34 catches behind the holding axle 26, the toggle clamp can be brought into position 2 by lifting the latch 34 out of its caught position. This takes place through actuation of the closing lever 32 in the direction of arrow H, whereby the toggle clamp ends up in position 2. The lifting out of the latch 34 here takes place through the joint pivoting movement with the closing lever around the closing lever axle so that this is lifted from the holding axle 26 under deflection of the spring 54. The lifting movement can be clearly seen in FIG. 2, since the boundary axle 50 in the second through hole 52 does not abut against its circumferential wall but is rather lifted from the circumferential wall against the spring tension.

A proximity sensor 70 is shown for each of the positions 1 to 4. In position 3, the proximity sensor 70 detects that the distance between the latch 34 and the proximity sensor 70 is reduced. It can be determined in this manner that the latch 34 is snapped onto the holding axle 26. In position 4 (clamped), the latch 34 pivots around the holding axle 26 so that the distance from the proximity sensor 70 is further reduced. The proximity sensor 70 can hereby determine that the toggle clamp is locked.

Depending on the signals of the sensor 70, a corresponding signal can be transmitted to the vehicle control system. Thus, for example, when the latch is not snapped in or the latch has not assumed the minimum distance to the proximity sensor 70, a corresponding signal can be triggered on the vehicle control system, which is for example displayed to a driver and/or even triggers the stopping of the vehicle. The industrial truck can thus be prevented from being used when the toggle clamp is not closed.

The invention claimed is:

1. A closure for an industrial truck, the closure comprising:
    a holding part configured to be attached to the industrial truck;
    a holding pin mounted to the holding part;
    a closure part coupled to a pivot axle, the closure part comprising,
        an anchoring element comprising a first lateral arm and a second lateral arm,
        a closing lever axle mounted to the first lateral arm and the second lateral arm,
        a boundary axle mounted to the first lateral arm and the second lateral arm,
        a closing lever pivotably mounted to the closing lever axle,
        a latch axle mounted to the closing lever,
        a latch having a first latch hole, a second latch hole, a third latch hole, and a latch nose, wherein the latch is mounted to the closing lever axle extending through the first latch hole, the latch is mounted to the boundary axle extending through the second latch hole, the latch is pivotably mounted to the latch axle extending through the third latch hole, and the latch nose is configured to engage the holding pin,
        a first spring element attached to the closing lever axle, wherein the first spring element is configured to push the closing lever into an open position with respect to the latch, and
        a second spring element attached to the latch axle, wherein the second spring element is configured to push the latch into a closed position with respect to the anchoring element; and
    a pivot axle configured to be attached to the industrial truck,
    wherein the latch is configured to contact the holding pin and deflect at least one of the spring elements, and the closing lever is configured to be actuated and move the latch axle and the pivot axle through a dead center formed with the holding pin and the closing lever is configured to be held in the closed position by the generated clamping force.

2. The closure of claim 1, wherein the latch axle is configured to move through a dead center formed with the holding pin in the closed position by pivoting the closing lever and by further pivoting the closing lever opposite the force of the first spring element and the latch is released from the holding pin.

3. The closure of claim 1, wherein the closure part is configured to mount to a pivotable industrial truck part.

4. The closure of claim 1, wherein the first spring element and the second spring element are identical.

5. The closure of claim 1, wherein the first latch hole is an elongated shape and the closing lever axle is restricted in its movement by at least one end stop.

6. The closure of claim 1, wherein the second latch hole has a circular shape and the boundary axle moves along the circumference of the third latch hole.

7. The closure of claim 1, when the latch nose is configured to engage or release from the holding pin, the boundary axle is no longer in contact with an interior surface of the second latch hole.

8. The closure of claim 1, wherein the closure part is configured to be arranged on a pivotable cover of the industrial truck, wherein the pivotable cover is configured to attach behind the latch on the holding pin when the latch is rotated into the closed position.

9. The closure of claim 1, wherein the closing lever is configured to release the latch from the holding pin after the latch axle has been moved through a dead center.

10. The closure of claim 8, wherein the closure part is configured to be arranged on a battery hood cover of the industrial truck and the closure part is configured to pivot on a bracket, wherein the bracket is configured to allow the latch to engage the holding pin in the closed position of the battery hood cover.

11. The closure of claim 1, wherein the anchoring element has a flat anchoring plate extending between the first and second lateral arms and a raised end section, wherein the anchoring plate at least one bore hole configured to attach the anchoring element to the industrial truck and the raised end section has at least one bore hole configured to adjust a dead center of the closure.

12. The closure of claim 1, wherein a sensor is configured to attach to the holding part at a predetermined distance from the holding pin, which detects engaging and releasing of the latch nose with the holding pin.

\* \* \* \* \*